United States Patent [19]

Bondoux

[11] 4,382,518

[45] May 10, 1983

[54] ASSEMBLY BETWEEN A POST AND A RAIL FOR A STORAGE RACK OR THE LIKE

[75] Inventor: Guy Bondoux, Orleans, France

[73] Assignee: Compagnie Generale de Manutention et de Stockage, Paris, France

[21] Appl. No.: 231,562

[22] Filed: Feb. 4, 1981

[51] Int. Cl.³ ............................................. A47F 5/00
[52] U.S. Cl. .................................. 211/192; 403/254; 248/221.3
[58] Field of Search ............... 211/192; 403/317, 316, 403/319, 252, 253, 254, 237; 248/243, 221.3; 108/110

[56] References Cited

U.S. PATENT DOCUMENTS

| | | | |
|---|---|---|---|
| 3,156,282 | 11/1964 | Bedford, Jr. | 403/254 |
| 3,503,641 | 3/1970 | Fraser | 248/221.3 X |
| 3,881,829 | 5/1975 | James | 211/192 X |
| 4,165,944 | 8/1979 | Sunasky | 211/192 X |
| 4,189,250 | 2/1980 | Abbott et al. | 211/192 X |
| 4,287,994 | 9/1981 | Klein | 403/254 X |

FOREIGN PATENT DOCUMENTS

| | | | |
|---|---|---|---|
| 2161889 | 6/1973 | Fed. Rep. of Germany | 403/254 |
| 2067706 | 7/1981 | United Kingdom | 211/192 |

Primary Examiner—James T. McCall
Assistant Examiner—Peter A. Aschenbrenner
Attorney, Agent, or Firm—Sughrue, Mion, Zinn, Macpeak and Seas

[57] ABSTRACT

The post is hollow and provided on one of the sides thereof with two longitudinal rows of openings having a generally T-shape, the lateral walls of the openings being convergent at the end thereof remote from the bar of the T. The rail is rigid with an L-shaped end plate which has a side parallel to the side of the post provided with the openings, which side carries projecting triangular tabs. The tabs are adapted to pass through the bars of the T of the openings and to bear on each side of the rectilinear part of the opening. A boss is locked between the convergent walls.

7 Claims, 5 Drawing Figures

ASSEMBLY BETWEEN A POST AND A RAIL FOR A STORAGE RACK OR THE LIKE

DESCRIPTION

The invention relates to a storage rack more particularly intended for the construction of a large-size structure for the purpose of supporting pallets or like loads.

The storage racks of this type are usually constructed by means of a metal structure comprising vertical posts which are interconnected by horizontal rails capable of supporting trays or simply pallets, depending on the utilisations.

The assembly between the posts and the rails must be very strong, have a high resistance to shocks which might occur during handling and have considerable rigidity.

For these reasons, the assemblies are usually achieved by means of openings formed in two vertical rows in the web of the post, and an L-section plate which is rigid with the end of the rail and has hooking means which fit in at least two openings of the same row of the posts, this post and the rail being formed by a hollow section member, for example a U-section member.

The assembly thus achieved is effective and usually satisfies the aforementioned requirements. However, the rail is held stationary with respect to the post not only by the fitting of the hooking means in the openings but also the close contact of the plate against the post.

Consequently, the dimensions of the post and of the plate must be extremely precise. Likewise, the openings and the locking means must be placed exactly in alignment. This complicates the structure and increases the cost.

An object of the present invention is to overcome this drawback and to provide an assembly in which the plate only needs to be in contact with the post on the side of the latter provided with the openings.

The invention provides an assembly which is for a storage rack and is capable of being taken down, in which the openings of the post have a generally T-shape with lateral walls which converge in the part thereof remote from the bar of the T, whereas the L-section plate of the rail comprises, on the inner face of the side of the plate parallel to the rail, at least two triangular tabs which are substantially perpendicular to said side and are each connected by a curved strip to a boss whose lateral walls converge in the same way as the walls of the opening of the post whereby said boss exactly fits in said opening.

The cooperation between the boss and the convergent part of the opening thus locks the plate with respect to the post against any lateral displacement. Further, the triangular tab ensures that the plate is held horizontally in contact with the post, so that the assembly between these two parts is completely ensured by the combination of the openings and the hooking means carried by one of the sides of the plate. The other side may be in contact with the wall of the post or may be slightly spaced away from the latter with no danger. Consequently, the punching of the two rows of openings relative to the flanges of the post requires no particular precision and yet the rigidity and the strength of the assembly are greater than those obtained with prior assemblies.

The advantages and features of the invention will be apparent from the ensuing description of embodiments of the invention which are given merely by way of example and shown in the accompanying drawings.

Figure 1:
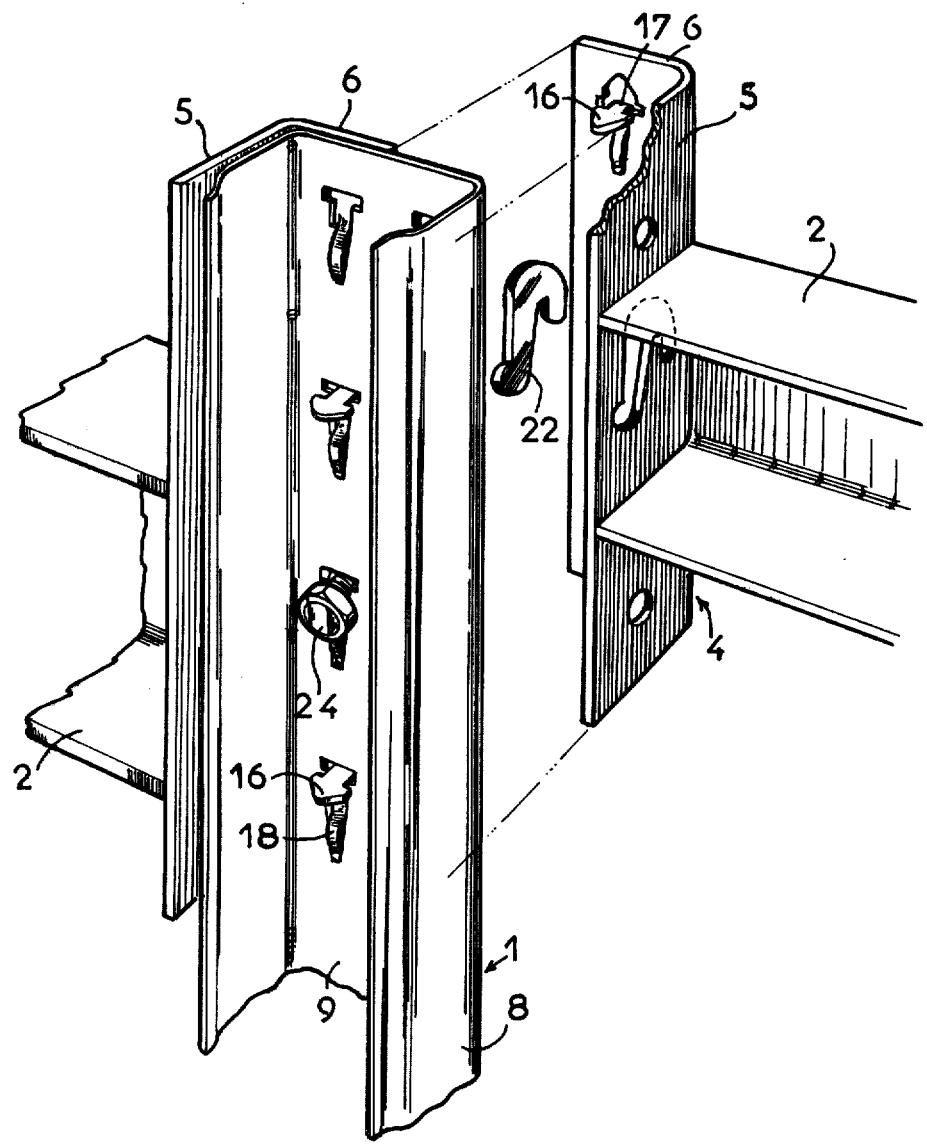
FIG. 1 is a perspective view of the assembly according to the invention before and after the mounting of a plate on a post.

As shown in the drawings and in particular in FIG. 1, the assembly according to the invention is adapted to unite a post 1 and a rail 2 which is constructed in a similar way to the post by means of a hollow substantially U-section member. When constructing a storage rack, the major part of the posts support two parallel rails which are hooked to each of these posts. These two rails may be at the same height or at different heights, depending on requirements.

Each of the rails 2 is rigid with a plate 4 which has an L-section, i.e. has one side 5 perpendicular to th rail and a side 6 parallel to the general direction of this rail. Each plate can thus be fitted on one of the corners of the post, the sides 5 and 6 being respectively parallel to the side 8 and to the side 9 of the post.

The side 9 is provided with two vertical rows of openings 10 which are all identical and located at equal distances apart from each other. Each of the openings 10 has a generally T-shape, i.e. has a wider part 11 constituting the bar of the T which is extended by a narrower rectilinear portion 12. The T-shaped opening has a narrowed lower portion 15, the lateral walls 13 and 14 of the opening being convergent in the lower part thereof, i.e. toward the end of the opening which is remote from the bar 11 of the T. The narrow portion 15 has consequently substantially the shape of an isosceles trapezium.

The openings 10 are adapted to cooperate, when assembling the storage rack, with hooking means carried by the small side 6 of the plate, i.e. by the side thereof which is parallel to the rail and consequently to the side 9 of the post. Each of the hooking means comprises a triangular tab 16 perpendicular to the side 6 and extending toward the interior of the plate 4.

The tab 16 is connected by a narrower curved strip 17 to a boss 18 (FIG. 3) whose upper portion has a slightly rounded shape. The boss 18 is defined by downwardly convergent lateral walls, i.e. walls which are convergent in a direction opposed to the tab 16, and the walls of the boss make an angle equal to that of the walls 13 and 14 of the opening 10, so that the boss 18 can fit exactly in this trapezoidal part of the opening and project inside the post.

Likewise, the length of the curved strip 17 is such that the triangular tab 16 is spaced from the side 6 of the plate a distance substantially corresponding to the thickness of the section member constituting the post 1, so that this triangular tab bears against the post when the plate is assembled with the latter.

It will be clear that in causing the triangular tab 16 to enter the wide part 11 of the opening 10, the boss 18 is inserted in the rectilinear part 12 and the beginning of the trapezium 15. A displacement of the plate 4 in a direction parallel to the post causes the curved strip 17 to descend in the rectilinear part 12 and applies the base of the triangular tab 16 against the inner face of the post 8. At the same time, the post 18 slides downwardly to the base of the trapezium 15 and is locked in the opening 10.

Preferably, each plate 4 has two identical hooking means each of which comprises a tab 16 and a boss 18. The same operation inserts the tabs 16 and the bosses 18 in two openings of the post 1, these openings not being directly superimposed as shown in particular in FIGS. 1 and 2. Thereafter, the plate 4 is locked against the post 1 laterally, i.e. against any horizontal displacement parallel to the rail 2, by the contact of the walls of the boss 18 against the walls 13 and 14 of the opening 10 and by the contact of the curved strip 17 with the walls of the rectilinear part 12. Further, the tabs 15 preclude any displacement in a direction perpendicular to the axis of the post. The rail is thus closely locked and the assembly resists not only horizontal movements but also bending forces due in particular to the presence of loads on the rail.

It will be understood that an additional locking precluding any accidental or untimely disassembly may be achieved by means of an opening 20 which is formed in the side 6 of the plate 4 at equal distances between the tabs 16. This opening 20 has, for example, a substantially rectangular shape which is extended at its base by a slot 21. When the plate is mounted on the post, the opening 20 is in facing relation to an opening 10 of the post and this permits the insertion of either a locking key 22 or a bolt 24 on which a nut may be tightened.

Figures 2, 3:
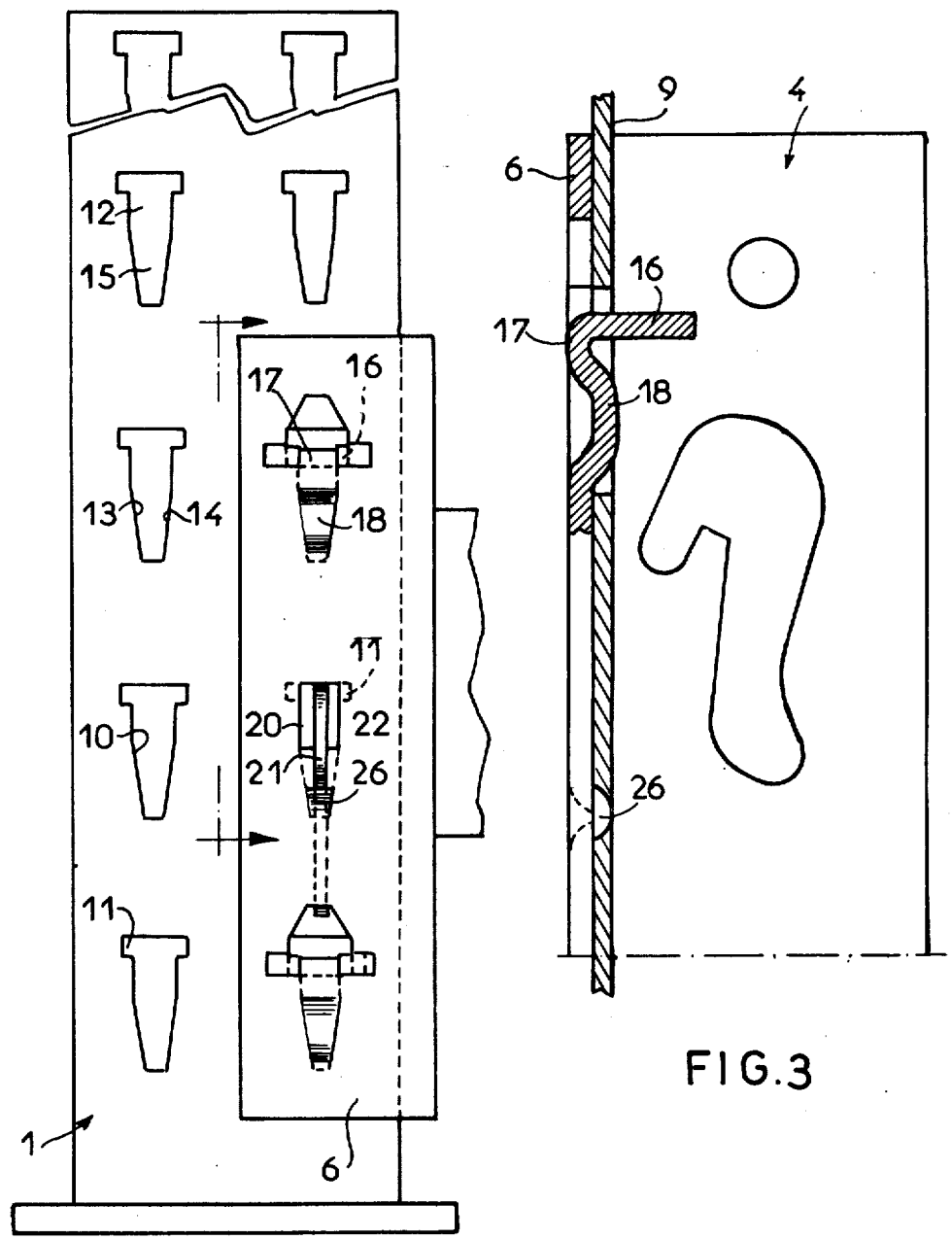
FIG. 2 is a front elevational view of a post on which a rail has been mounted.
FIG. 3 is a partial sectional view taken on line 3—3 of FIG. 2 of the plate of the rail.
Figure 4:
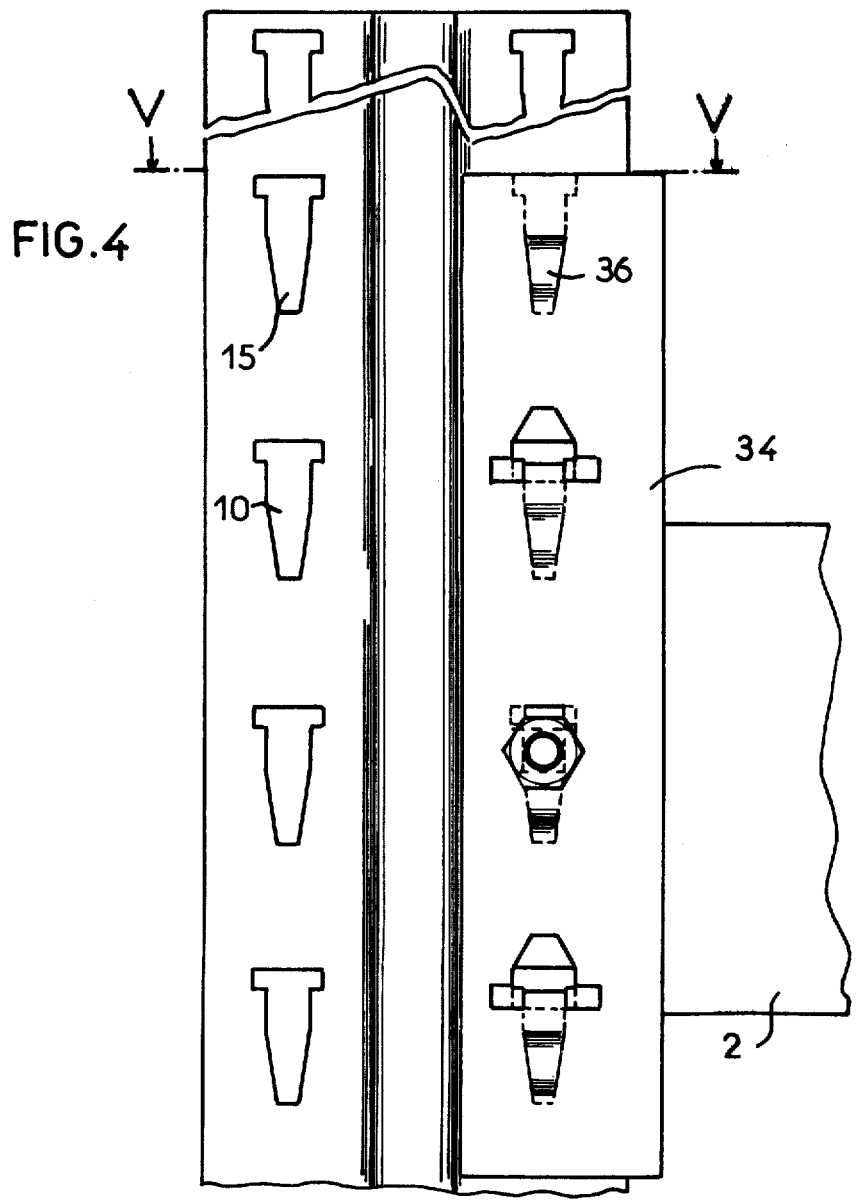
FIG. 4 is a view similar to FIG. 2 of a modification of the invention.

Further, the side 6 of the plate has below the opening 20 a small internal boss 26 which has, as the bosses 18, a substantially trapezoidal vertical cross-sectional shape and is capable of fitting in the lower part of the opening 10 in facing relation to the opening 20, the boss 26 affording a complementary centering (FIGS. 2 and 3).

In a preferred embodiment, shown in the drawings, the tabs 16, the bosses 18 and the boss 26 are obtained by means of indentations which are cut and press-formed in the wall of the side 6 of the plate. Consequently, the boss 18 is formed by a curved wall which is upset on the inner face of the side 6 to an extent corresponding to the thickness of the side 6.

The boss has a concavity on the outside of the plate and a convexity on the inner face of the side 6.

The tab 16 is also cut out in the side 6 and then formed over by bending the strip 17 which connects it to the boss 18.

Preferably, the thickness of the metal which constitutes the plate 4 exceeds the thickness of the section member forming the post 1, so that the boss 18 projects from the inside of the post and the tab 16 is in contact with the inner face of the post.

In a modification, when the assembly must withstand very heavy loads in particular, the plate 34 has not only the two hooking means and the boss 26 shown in FIG. 2, but also an upper boss 36 similar to the bosses 18 and also adapted to fit in the trapezoidal part 15 of an opening 10. The plate 34 thus has an additional fixing point to the post which still further increases its rigidity and its resistance to forces.

It must be understood that other modifications may be made in the construction of the plate for the purpose of completing the fixing thereof. The plate has however the considerable advantage of being easy to assembly and of immediately providing a rigid embedding, which permits increasing the limit moment and the coefficient of embedding of the assembly.

Further, the particular shape of the openings and the shape of the indentations forming the tabs and the bosses permits the use of practically the same tools for producing them, which ensures similarity of their dimensions and avoids any play in the fitted assembly.

Figure 5:
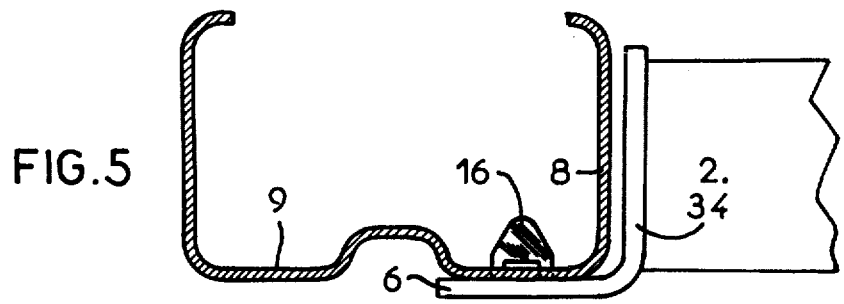
FIG. 5 is a sectional view taken on line 5—5 of FIG. 4.

As shown in particular in FIG. 5, the side 6 of the plate which carries the hooking means is in close contact with the face of the post, while the side 5 of this plate may be at a slight distance from the corresponding face 8 of this post. The dimensions of the post and of the plate in no way intervene in the effectiveness of the interlocking and only the hooking means and the openings have a function.

The construction of such an assembly is consequently facilitated and this permits reducing its price while affording an improved effectiveness.

Having now described my invention what I claim as new and desire to secure by Letters Patent is:

1. An assembly which is for a storage rack or the like and is capable of being taken down, comprising at least one hollow post having a side provided with two rows of identical openings extending longitudinally of the post, a rail, a rigid L-section plate rigid with an end of the rail, the plate carrying hooking means for hooking in the openings of the post, the openings of the post having the general shape of a T which has a cross-portion and an upright portion, the upright portion having lateral walls which are convergent in a part of the upright portion remote from the cross-portion of the T, the plate having a first side parallel to the rail and a second side perpendicular to the first side, the hooking means comprising at least two triangular tabs which are substantially perpendicular to a face of said first side of the plate which is adjacent said rail and are each connected by a curved strip to a boss which has lateral walls which are convergent in the same way as the lateral walls of the upright portion of the corresponding opening of the post, whereby the boss fits exactly in said opening.

2. An assembly according to claim 1, wherein each of the openings comprises in the upright portion a rectilinear part between the convergent part and the cross-portion of the T, the curved strip of the hooking means of the plate having the same width as said rectilinear part and a length exceeding the thickness of the post, whereby the triangular tab urges the plate against the post.

3. An assembly according to claim 1 or 2, wherein the triangular tabs are cut in the plate and offset toward the interior of the plate.

4. An assembly according to claim 1 or 2, wherein the boss is rounded and projects to an extent equivalent to the thickness of the plate.

5. An assembly according to claim 4, wherein the boss is formed by cutting the wall of the plate and a press-forming operation so that it has a concave face on the outside of the plate.

6. An assembly according to claim 1 or 2, wherein the plate also has a locking opening which is provided at an equal distance from the two triangular tabs for the purpose of placing in position an additional locking means.

7. An assembly according to claim 6, wherein the plate has a small additional boss below the locking opening, said additional boss having a shape which is complementary to the lower part of an opening of the post.

* * * * *